US012389499B2

(12) United States Patent
Berioli et al.

(10) Patent No.: US 12,389,499 B2
(45) Date of Patent: Aug. 12, 2025

(54) INDUCTION HEATER FOR A COOKTOP

(71) Applicant: I.R.C.A. S.P.A. INDUSTRIA RESISTENZE CORAZZATE E AFFINI, Vittorio Veneto (IT)

(72) Inventors: Mauro Berioli, Vittorio Veneto (IT); Antonio De Moliner, Oderzo (IT); Francesco Giusto, Mestre (IT); Federico Zoppas, Treviso (IT)

(73) Assignee: I.R.C.A. S.P.A. INDUSTRIA RESISTENZE CORAZZATE E AFFINI, Vittorio Veneto (IT)

( * ) Notice: Subject to any disclaimer, the term of this patent is extended or adjusted under 35 U.S.C. 154(b) by 846 days.

(21) Appl. No.: 17/632,207

(22) PCT Filed: Jul. 31, 2020

(86) PCT No.: PCT/IB2020/057260
§ 371 (c)(1),
(2) Date: Feb. 1, 2022

(87) PCT Pub. No.: WO2021/024130
PCT Pub. Date: Feb. 11, 2021

(65) Prior Publication Data

US 2022/0287159 A1 Sep. 8, 2022

(30) Foreign Application Priority Data

Aug. 2, 2019 (IT) ........................ 102019000013785

(51) Int. Cl.
*H05B 6/12* (2006.01)
*H05B 6/06* (2006.01)

(52) U.S. Cl.
CPC ......... *H05B 6/1281* (2013.01); *H05B 6/1254* (2013.01); *H05B 2206/022* (2013.01); *H05B 2213/03* (2013.01); *H05B 2213/05* (2013.01)

(58) Field of Classification Search
CPC .......... H05B 2206/022; H05B 2213/03; H05B 2213/05; H05B 6/1254; H05B 6/1281
(Continued)

(56) References Cited

U.S. PATENT DOCUMENTS

2010/0237064 A1* 9/2010 Liu ..................... H05B 6/1209 219/622

FOREIGN PATENT DOCUMENTS

EP 2981154 A1 2/2016
EP 3422812 A1 1/2019
(Continued)

OTHER PUBLICATIONS

EP2981154A1 Translation, "Method and Device for recognizing the position of a pot on an induction hob", Mar. 2, 2016, by WIPO. (Year: 2016).*
(Continued)

*Primary Examiner* — Quang T Van
(74) *Attorney, Agent, or Firm* — Stetina Garred Brucker & Newboles

(57) ABSTRACT

An induction heater for a cooking surface. The induction heater includes an electrically insulating layer, at least one inductor defining a winding adapted to heat at least one cooking utensil, at least one sensor adapted to detect whether the at least one cooking utensil is placed above the cooking surface, and at least one magnetic flux concentrator. The at least one inductor and the at least one sensor are arranged on the electrically insulating layer. That layer is interposed between the at least one inductor and the at least one magnetic flux concentrator.

21 Claims, 4 Drawing Sheets

(58) Field of Classification Search
USPC ....... 219/624, 620, 622, 625, 626, 627, 647, 219/660, 661, 662, 663, 665, 667, 668, 219/671, 672, 675, 676, 677
See application file for complete search history.

(56) References Cited

FOREIGN PATENT DOCUMENTS

| | | | |
|---|---|---|---|
| GB | 2055030 | A | 2/1981 |
| WO | 2019092653 | A1 | 5/2019 |

OTHER PUBLICATIONS

Patent Cooperation Treaty, International Search Report and Written Opinion for International Application No. PCT/IB2020/057260, mailed Nov. 16, 2020, 13 pages.

* cited by examiner

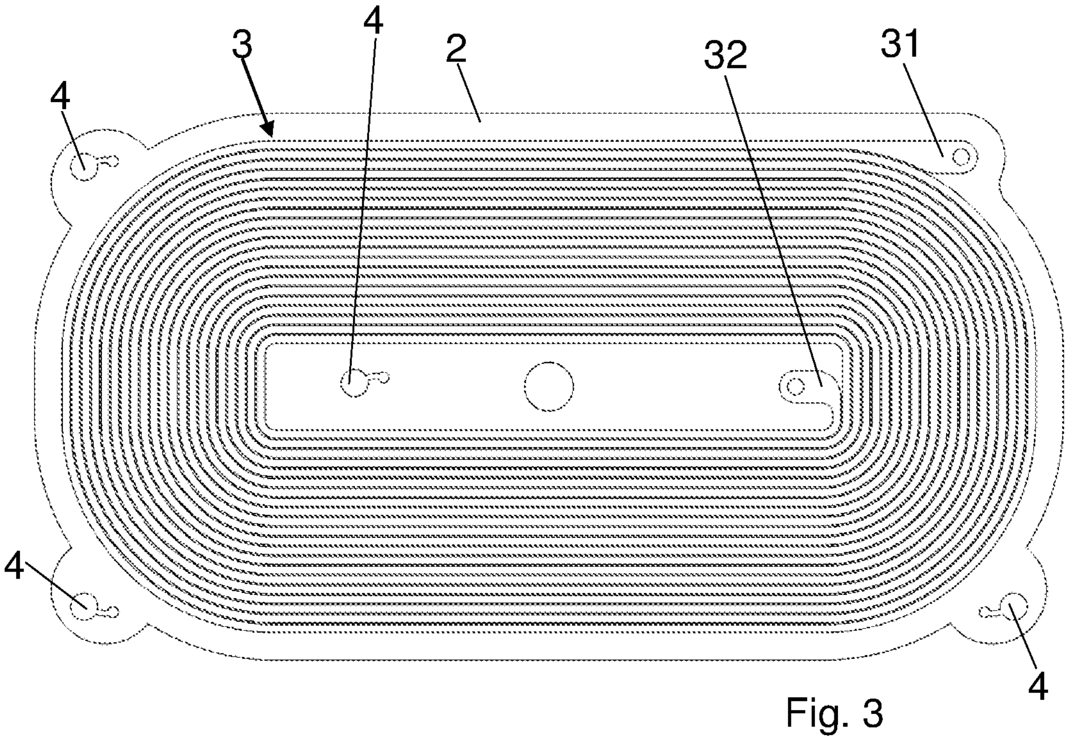
Fig. 3
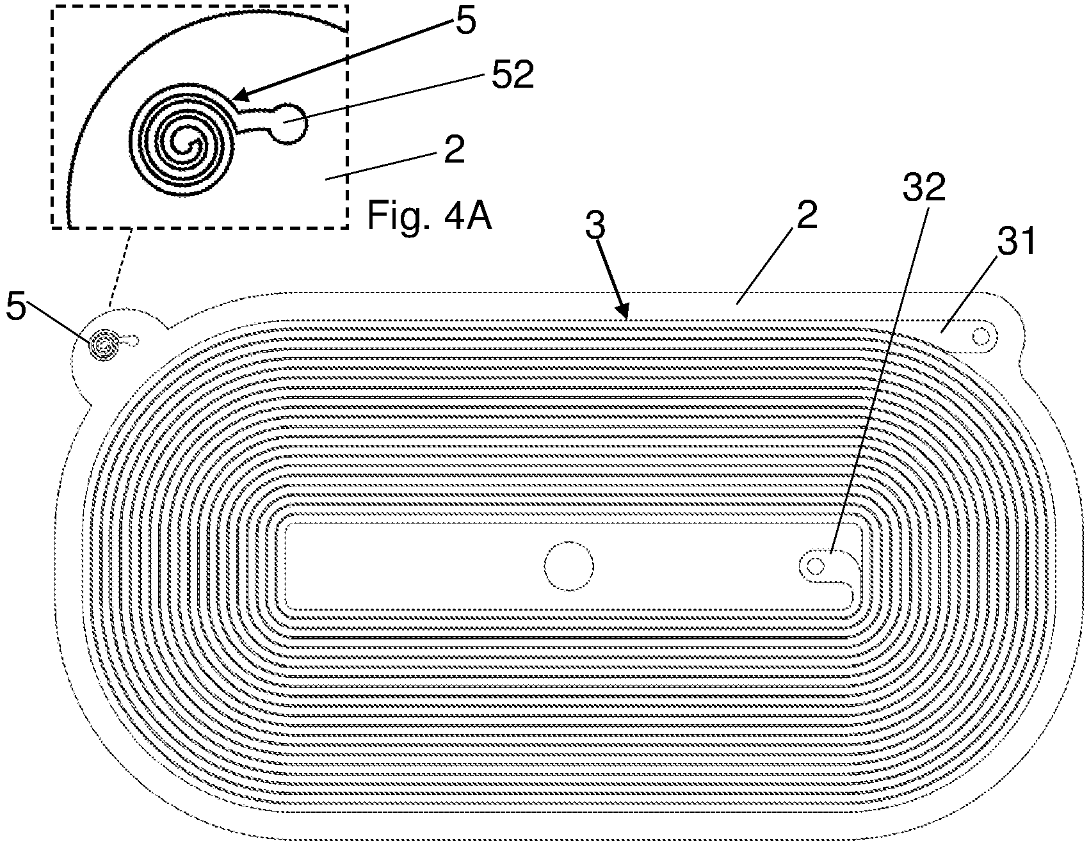
Fig. 4A
Fig. 4

Fig. 5A
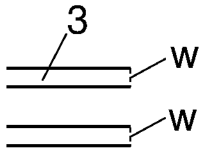
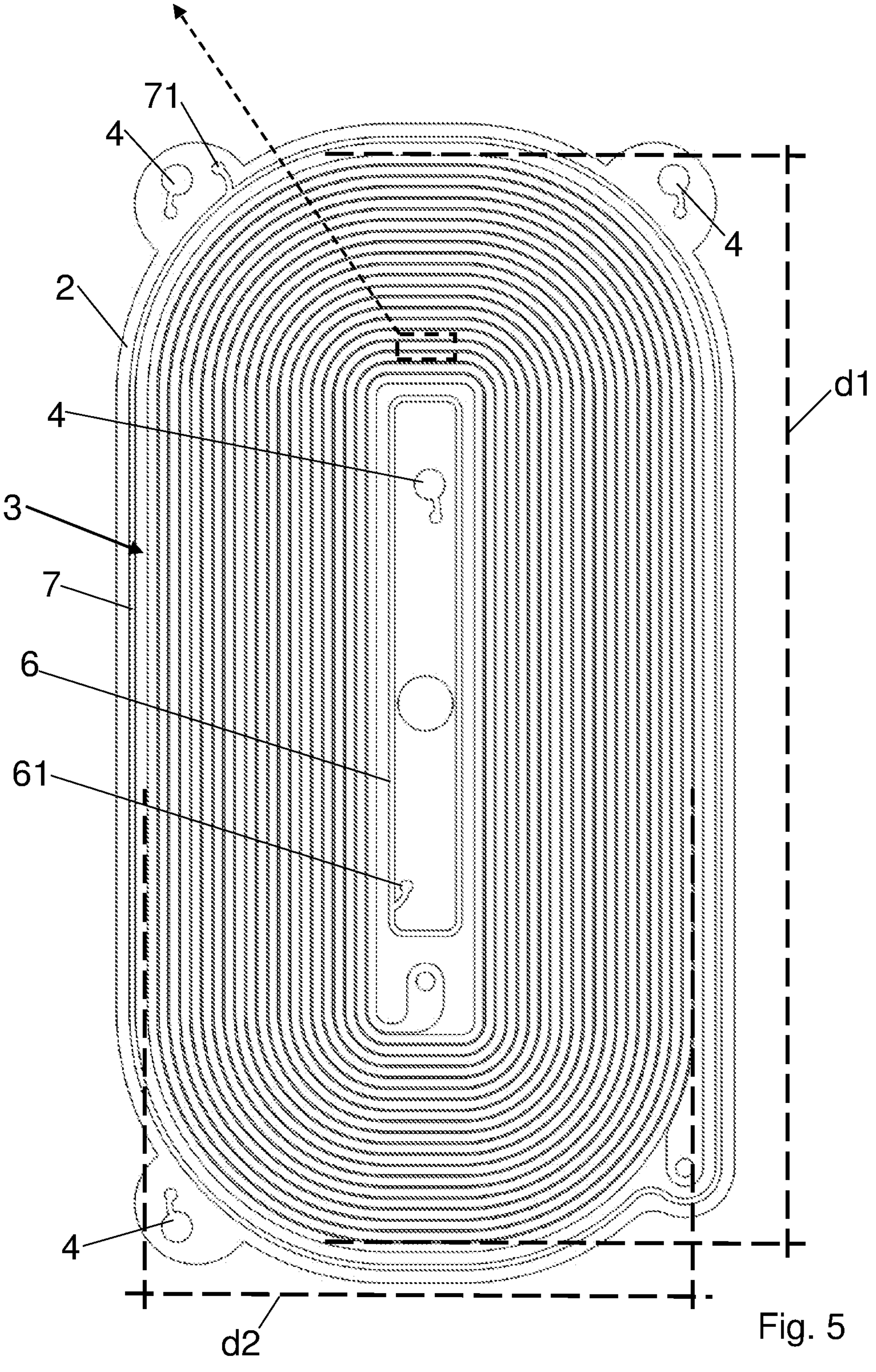
Fig. 5

INDUCTION HEATER FOR A COOKTOP

CROSS-REFERENCE TO RELATED APPLICATIONS

This application claims priority to PCT International Application No. PCT/IB2020/057260 filed on Jul. 31, 2020, which application claims priority to Italian Patent Application No. 102019000013785 filed on Aug. 2, 2019, the disclosures of which are expressly incorporated herein by reference.

STATEMENT RE: FEDERALLY SPONSORED RESEARCH/DEVELOPMENT

Not applicable.

BACKGROUND OF THE INVENTION

Field of the Invention

The present invention relates to an induction heater for a cooking surface, for example, the cooktop of a kitchen, and to a cooking device or cooktop comprising such an induction heater.

BACKGROUND ART AND CONTEXT OF THE INVENTION

Induction cooktops allow to heat pots which have a ferromagnetic bottom and are increasingly used.

An induction cooktop comprises one or more inductors.

In a first type of cooktops, the arrangement, number, and features of the inductors are such that each inductor corresponds to a specific position where a pot is to be positioned, as it substantially occurs with gas cookers. In other words, each pot must be positioned above a respective inductor.

Recently, alternative solutions have been developed in which the pot may be positioned freely, substantially in any area of the cooktop. In this second type, given a size of the cooktop equal to that of the first type, the number of inductors is greater, and the size of each inductor is smaller.

This second type of cooktops, which includes a multitude of inductors, entails, however, high production costs and is rather complex to manufacture.

It is therefore necessary to find a compromise in which the inductors, with respect to the second type, are smaller in number and have a larger size. Such a compromise may be achieved by equipping the cooktop with sensors to detect the presence of a pot.

A possible implementation of such a technical solution may involve arranging the inductors and the sensors on completely distinct levels with respect to each other.

However, such an implementation would still involve rather high costs and would not be easily producible.

Furthermore, this solution would disadvantageously lead to an increase in the distance between the inductors and the surface of the cooktop on which the pots are placed. In fact, the sensors must be arranged in a position proximal with respect to such a surface of the cooktop, and therefore the sensors must be arranged completely above the inductors so as to adequately perform the function thereof.

The need is therefore felt, in particular, to manufacture an induction cooktop equipped with sensors in a more cost-effective and easier manner.

SUMMARY OF THE INVENTION

It is an object of the present invention to provide an induction heater provided with sensors, which can be made in a more cost-effective and easier manner.

In particular, it is an object of the invention to provide an induction heater which allows making a cooktop or cooking device in a more cost-effective and easier manner.

It is another object of the present invention to provide an induction heater which, not only can be made in a more cost-effective and easier manner, but also allows the pots to be heated effectively and efficiently while allowing an adequate detection of the presence of the pots.

The present invention achieves at least one of such objects, and other objects which will become apparent in view of the present description, by an induction heater for a cooking surface, the induction heater comprising an electrically insulating layer or support; at least one inductor defining a winding adapted, at least, to heat at least one cooking utensil; at least one sensor (i.e., one or more sensors) adapted, at least, to detect whether the at least one cooking utensil is arranged above the cooking surface; wherein said at least one inductor and said at least one sensor are arranged on said electrically insulating layer or support.

In particular said at least one inductor and said at least one sensor adhere, in particular directly adhere, to said electrically insulating layer, i.e., to the same electrically insulating layer.

In particular, preferably, said at least one inductor and said at least one sensor are in contact, in particular substantially directly in contact, with the electrically insulating layer. The electrically insulating layer is particularly adapted to be arranged on a support or carrier plate on which, for example, other induction heaters may be arranged.

The invention also relates to a cooktop component, comprising a plurality of induction heaters.

The invention also relates to a cooktop or cooking device, comprising at least one induction heater or at least one aforesaid component.

The invention also relates to a process for manufacturing an induction heater 20 in which there is provided the removal of material from at least one electrically conductive foil, in particular made of metal, to manufacture said at least one inductor and said at least one sensor.

Advantageously, the at least one inductor and the at least one sensor are substantially arranged on the same layer or support which, in particular, is electrically insulating. Therefore, production costs are low, manufacturing times are quick and assembly operations are particularly easy.

For example, advantageously, said at least one inductor and said at least one sensor can be produced by means of the same production process, preferably during the same step of the production process. The production process may, for example, comprise at least one step of etching a metal foil, for example chemical etching or etching by laser cutting.

The production process of the induction heater may also be easily carried out.

Furthermore, advantageously, both the at least one inductor and the at least one sensor, being substantially coplanar, may be arranged close to the surface of the cooktop on which the pots are placed. Therefore, the at least one inductor may heat the cooking utensils effectively and efficiently, and the at least one sensor may adequately perform its function. The at least one sensor is used, in particular, to detect the presence of at least one cooking utensil at the at least one sensor. The at least one inductor may therefore be activated selectively by means of suitable control electronics.

Furthermore, since the induction heater is thin, embodiments may be provided in which one or more sensors are arranged on the opposite surface with respect to the at least one inductor, and the sensors may still adequately perform their function.

The at least one inductor and the at least one sensor are preferably substantially coplanar.

Preferably, and advantageously, said at least one inductor and said at least one sensor are flat, i.e., they are flat elements. In particular, the at least one inductor and the at least one sensor are not formed by a spiral-wound metal wire, in particular according to a spiral whose coils extend distally from the electrically insulating layer.

The at least one inductor and the at least one sensor are preferably and advantageously obtained from at least one metal foil, for example, from the same metal foil or from two metal foils. Therefore, preferably, the at least one inductor and the at least one sensor comprise or consist of portions of foil.

Preferably, said at least one inductor has a thickness from 0.1 to 0.6 mm, and/or said at least one sensor has a thickness from 0.01 to 1 mm.

Preferably, the distance between the surface of the electrically insulating layer and the surface of the at least one inductor, which face each other, is from 0 to 0.5 mm, for example from 0 to 0.25 mm; and/or the distance between the surface of the electrically insulating layer and the surface of the at least one sensor, which face each other, is from 0 to 0.5 mm, for example from 0 to 0.25 mm.

Preferably, the electrically insulating layer or support has a thickness of 0.02 to 2 mm, for example from 0.05 to 0.5 mm; and/or the at least one inductor has a thickness from 0.1 to 0.6 mm, for example from 0.2 to 0.4 mm; and/or the at least one sensor has a thickness of 0.01 to 1 mm, for example from 0.1 to 0.4 mm.

The thin thickness of the induction heater also offers other advantages, for example, it allows reducing the overall bulkiness of the cooktop.

Preferably, the induction heater comprises two or more sensors, for example two, three or four sensors, arranged on said electrically insulating layer or support, at least adapted to detect whether the cooking utensil is arranged above the sensor/s.

In all the embodiments, preferably, at least one magnetic flux concentrator is provided; i.e., the induction heater comprises at least one magnetic flux concentrator.

The magnetic flux concentrator is preferably made, for example, of ferrite or comprises ferrite.

The electrically insulating layer is interposed between the at least one inductor and the magnetic flux concentrator; i.e., in other words, the electrically insulating layer is arranged between the magnetic flux concentrator and said at least one inductor.

Preferably, the electrically insulating layer is also interposed between at least one sensor of said one or more sensors and the magnetic flux concentrator.

Preferably, the magnetic flux concentrator is in contact with the electrically insulating layer, preferably directly in contact with the electrically insulating layer.

Advantageously, the assembly comprising the electrically insulating layer, said at least one inductor and said at least one sensor, and preferably also said at least one magnetic flux concentrator and optionally also a further support arranged below the at least one magnetic flux concentrator, may be easily assembled, for example, on a support or carrier plate.

Preferably, in all the embodiments, electrically conductive means may be provided arranged between the at least one inductor and the at least one sensor. The electrically conductive means may act as shielding means, in particular, when the electrically conductive means are placed at the same potential as the sensor or at the potential of the ground, i.e., at the ground potential.

The electrically conductive means may in particular shield the at least one sensor from interferences, for example, of electromagnetic nature, caused by the at least one inductor.

Preferably, the electrically conductive means and one or more sensors are arranged on the same surface as the electrically insulating layer.

Preferably, but not exclusively, the at least one inductor, one or more sensors and the electrically conductive means are arranged on the same surface as the electrically insulating layer.

By way of example only, the electrically conductive means comprise or are at least one electrically conductive track arranged between the at least one inductor and the at least one sensor.

Instead of the track, the electrically conductive means may comprise or consist of an electrically conductive net or hatch.

The induction heater is adapted both for a cooktop, for example a built-in one, as well as for a countertop cooking device, in particular a mobile one, also called free-standing device.

The cooking utensil is in particular adapted to be heated by the induction heater. The cooking utensil or container is, for example, a pot or pan.

Further features and advantages of the invention will become more apparent in the light of the detailed description of exemplary but not exclusive embodiments.

The dependent claims describe particular embodiments of the invention.

BRIEF DESCRIPTION OF THE DRAWINGS

In the description of the invention, reference is made to the accompanying drawings, which are provided by way of non-limiting example, in which:

FIG. 3 shows a top plan view of another example of induction heater in accordance with the invention;

FIG. 4 shows a top plan view of another example of induction heater in accordance with the invention;

FIG. 4A shows an enlarged detail in FIG. 4;

FIG. 5 shows a top plan view of another example of induction heater in accordance with the invention;

FIG. 5A diagrammatically shows an enlarged detail in FIG. 5;

The same elements have the same reference numeral.

DESCRIPTION OF EXEMPLARY EMBODIMENTS OF THE INVENTION

Figure 1:
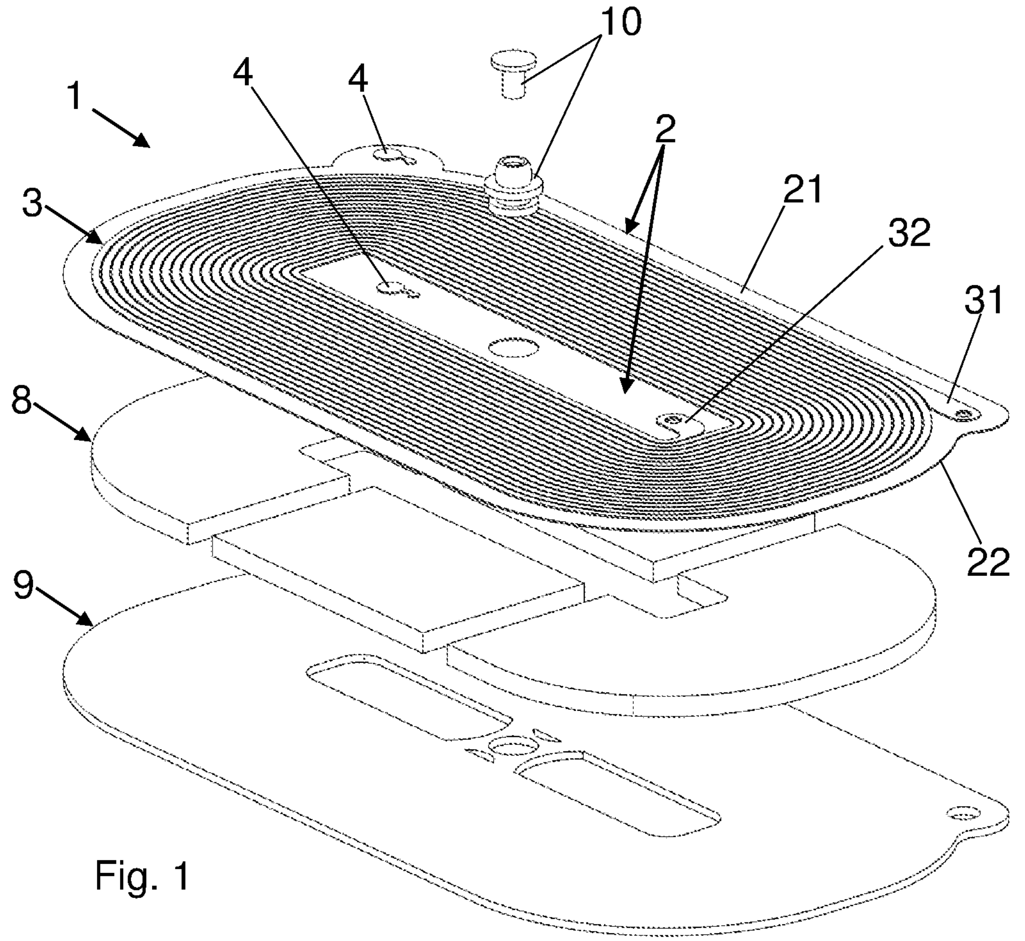
FIG. 1 shows an exploded perspective view of an induction heater in accordance with the invention.

With reference to the Figures, an induction heater 1 for a cooking surface is described.

In all the embodiments, the induction heater 1 comprises at least one inductor 3 and at least one sensor 4, 5 arranged on a layer 2, or support, in particular on the same layer 2, or support, which is electrically insulating or substantially electrically insulating.

In particular, said at least one inductor 3 and said at least one sensor 4, 5 are fixed, in particular they adhere, to the layer 2.

For example, said at least one inductor 3 and said at least one sensor 4, 5 can directly adhere to the electrically insulating layer 2. In this case, for example, one or both the surfaces 21, 22 of the layer 2 may be adhesive.

Furthermore, or alternatively, said at least one inductor 3 and said at least one sensor 4, 5 may adhere to the layer 2 by means of a fixing layer or adhesive layer, in particular, by means of a respective fixing layer (not shown) or adhesive layer. One or more adhesive layers may therefore be provided. The adhesive layer which fixes the layer 2 with the at least one inductor 3 is preferably in contact, in particular directly in contact, with the layer 2 and/or with the at least one inductor 3; and the adhesive layer which fixes the layer 2 with the at least one sensor 4, 5 is preferably in contact, in particular directly in contact, with the layer 2 and/or with the at least one sensor 4, 5.

Preferably, between the layer 2 and the at least one inductor 3 only the adhesive layer (when provided) is present, and similarly between the layer 2 and the at least one sensor 4, 5 only the adhesive layer (when provided) is present.

The at least one inductor 3 and the at least one sensor 4, 5 are preferably and advantageously flat. Preferably, the at least one inductor 3 and the at least one sensor 4, 5 are completely arranged on said electrically insulating layer 2.

The at least one inductor 3 and the at least one sensor 4, 5 are, in particular, electrically conductive elements, for example made of metal, which can perform, at least or exclusively, the function, respectively, of an inductor for heating at least the cooking utensil or container and of a sensor to detect if at least one cooking utensil is arranged above the cooking surface, in particular at the at least one sensor 4, 5.

The at least one inductor 3 and the at least one sensor 4, 5 may, in particular, perform the function thereof as a sensor, for example, when they are electrically connected to an electronic control unit, in particular to a reading circuit.

The at least one inductor 3 may also be used to detect if a cooking utensil is arranged thereabove, optionally cooperating with the at least one sensor 4, 5 so as to obtain a more accurate detection.

The at least one sensor 4, 5 may also be used as a temperature sensor.

Preferably, the layer 2, the at least one inductor 3 and the at least one sensor 4, 5 are elements distinct from one another.

The layer 2 preferably has a thickness from 0.02 to 2 mm, for example, from 0.05 to 0.5 mm.

The layer 2, or substrate or support, may, for example, be a sheet.

The layer 2 is preferably made of polymeric material. For example, the sheet 2 may be made of an elastomeric material such as a silicone, or of Polyimide (PI), for example, Kapton@, or of a material containing aramid fibers, for example, Nomex®; it may also be made of another insulating material, for example, mica.

The layer 2 may optionally comprise or consist of two or more sub-layers.

The layer 2 comprises two surfaces 21, 22 (FIG. 1), or faces or sides, opposite to each other and preferably parallel to each other. The surfaces 21, 22 are the surfaces with the greatest surface extension of the layer 2.

Said at least one inductor 3 and said at least one sensor 4, 5 may be arranged on the same surface 21 or 22 of the electrically insulating layer 2. For example, in the particular embodiments shown in the Figures, said at least one inductor 3 and said at least one sensor 4, 5 are arranged on the same surface 21 of the layer 2. In this case, preferably, part of the side surface of the at least one sensor 4, 5 faces part of the side surface of at least one inductor 3. For example, part of the side surface of one, two, three, four or more sensors 4, 5 faces part of the side surface of at least one inductor 3. Said side surfaces extend transversely, for example orthogonally, with respect to the layer 2.

Alternatively, in embodiments not shown, said at least one inductor 3 and said at least one sensor 4, 5 can be arranged on opposite surfaces of the electrically insulating layer 2. For example, the at least one inductor 3 may be arranged on the surface 21 and the at least one sensor 4, 5 may be arranged on the surface 22.

In the embodiments in which two or more sensors 4, 5 are provided, all the sensors 4, 5 may be arranged on the same surface of the layer 2, in particular the surface where the at least one inductor 3 is arranged or the surface of the layer 2 opposite to that on which the at least one inductor 3 is arranged. Alternatively, one or more sensors 4, 5 may be arranged on the surface where the at least one inductor 3 is arranged and one or more sensors 4, 5 may be arranged on the surface opposite to that on which the at least one inductor 3 is arranged.

In any case, preferably, the distance between the surface of the electrically insulating layer 2 and the surface of the at least one inductor 3, which face each other, is from 0 to 0.5 mm, for example, from 0 to 0.25 mm; and/or the distance between the surface of the electrically insulating layer 2 and the surface of the at least one sensor 4, 5, which face each other, is from 0 to 0.5 mm, for example from 0 to 0.25 mm.

When the said distance is equal to 0, there is a direct contact.

Said at least one inductor 3 defines a winding, and, in particular, it comprises a plurality of coils. The winding is, for example, a substantially spiral winding, preferably, a flat spiral winding.

The at least one inductor 3, in particular, comprises or consists of an electrically conductive track.

The inductor 3, in particular the electrically conductive track, is preferably made of metal, for example, copper or aluminum, or copper alloy or aluminum alloy.

The inductor 3, in particular, the conductive track, preferably has a thickness from 0.1 to 0.6 mm (i.e., from 100 to 600 μm), for example, from 0.2 to 0.4 mm.

The thickness of the at least one inductor 3 is measured perpendicularly to the layer 2, in particular, perpendicularly to the surface 21 or the surface 22 where the at least one inductor 3 is arranged.

The thickness of the at least one sensor 4, 5 is preferably from 10 to 1000 μm (i.e., from 0.01 to 1 mm).

The thickness of the at least one sensor 4, 5 is also measured perpendicularly to the layer 2, in particular, perpendicularly to the surface 21 or to the surface 22 where the at least one sensor 4, 5 is arranged.

Preferably, but not exclusively, when the at least one inductor 3 and the at least one sensor 4, 5 are arranged on the same surface 21 or 22, the at least one inductor 3 and the at least one sensor 4, 5 have the same thickness or substantially the same thickness. For example, the possible difference between the thickness of the at least one inductor 3 and the thickness of the at least one sensor 4, 5 may be from ±5% to ±10%.

When the at least one inductor 3 and the at least one sensor 4, 5 are arranged on opposite surfaces of the layer 2, the at least one inductor 3 and the at least one sensor 4, 5 may have a different thickness with respect to each other, or they may have the same thickness or substantially the same thickness. In the latter case, any difference in thickness may, for example, be from ±5% to ±10%.

Preferably, the at least one inductor 3 has a substantially rectangular shape, with rounded corners, or a square shape, with rounded corners, or it may have a substantially circular shape.

Parallel to the layer 2, and perpendicularly to the thickness, the at least one inductor 3 has two lengths perpendicular with respect to each other, indicated respectively with the references d1 and d2 in FIG. 5.

The length d1 is, in particular, a first maximum length of the at least one inductor 3 and the length d2 is in particular a second maximum length of the at least one inductor 3. In particular, the length d1 and the length d2 are respectively a first maximum length and a second maximum length of the outermost coil of the at least one inductor 3.

The length d1 is preferably greater than length d2. For example, the length d1 is from 20% to 200% greater than the length d2.

In other words, preferably, each inductor 3 has two longer sides and two shorter sides. Preferably, the two longer sides are parallel to each other and the two shorter sides are parallel to each other.

Alternatively, the length d1 may be equal to, or substantially equal to, the length d2.

By way of example only, the length d1 may be from 50 to 150 mm, and/or the length d2 may be from 50 to 250 mm.

Preferably, the width w (FIG. 5A) of the conductive track of the at least one inductor 3 is from 0.1 to 1 mm.

Preferably, the at least one inductor 3 has a number of coils from 10 to 100.

Preferably, the pitch between the coils of the at least one inductor 3 is from 0.1 to 1 mm, where the pitch indicates in particular the distance between corresponding points between two consecutive coils.

Preferably, but not exclusively, each coil comprises, or consists of, four straight stretches joined, two by two, by a respective curved stretch. In other words, two straight stretches are joined by a respective curved stretch. The straight stretches are preferably, two by two, parallel to each other.

Optionally, only the innermost coil and/or the outermost coil have one or more straight stretches less and/or one or more curved stretches less than the other coils.

Preferably, the radius of curvature of the curved stretches of the coils is increasing from the innermost towards the outermost coil. In particular, it is preferable that the radius of curvature of the curved stretches gradually increases, preferably linearly, from the innermost coil towards the outermost coil. Preferably, between one coil and the next one, the radius of curvature increases by a value equal to the pitch between the coils. Preferably, the curved stretches of each coil have a radius of curvature equal to or substantially equal to one another.

Preferably, the radius of curvature of the curved stretches of the innermost coil is from 1 to 50 mm, and the radius of curvature of the curved stretches of the outermost coil is from 10 to 250 mm.

Alternatively, however, it is still possible to provide that the radius of curvature of the coils of the at least one inductor 3 is substantially the same for all coils, for example with a value selected from the range from 1 to 50 mm.

The at least one inductor 3, in particular, the conductive track, preferably comprises one or two end portions 31, 32, by means of which the inductor 3 may be electrically powered. In the examples shown, the at least one inductor 3 is provided with two end portions 31, 32 for the electrical power supply. For example, one of the two end portions 31 extends from the outermost coil of the inductor 3 and the other end portion 32 extends from the innermost coil of the inductor 3.

Optionally, in the embodiments in which two or more inductors 3 are provided, all or part of the inductors 3 may be electrically connected to one another by means of conductive connection tracks (not shown). Preferably, but not exclusively, the conductive connection tracks and inductors 3 are obtained from the same metal foil, for example by etching. When the inductors 3 are connected to one another by means of the conductive connection tracks, optionally, only two of the inductors 3 may be provided with a single respective end portion while the other inductors are not provided with end portions for the power supply. Thereby, all the inductors 3 can be electrically powered by means of only two end portions.

The at least one sensor 4, 5, as already said, is in particular adapted, or at least adapted, to detect if a pot is arranged above the induction heater 1, and more in particular on the cooking surface comprising at least one induction heater 1. Since the at least one sensor 4, 5 is preferably arranged close to the at least one inductor 3, the at least one sensor 4, 5 may in fact detect if at least one cooking utensil is arranged at least partially on the at least one inductor 3.

The at least one sensor 4, 5 is preferably made of metal, for example, copper or aluminum, or copper alloy or aluminum alloy.

Preferably, the at least one sensor 4, 5 and the at least one inductor 3 are made of the same material.

The at least one sensor 4, 5 may be arranged inside or outside the winding defined by said at least one inductor 3. In particular, the at least one sensor 4, 5 may be outside the outermost coil of the at least one inductor 3, or it may be surrounded by the at least one inductor 3, more in particular by the innermost coil thereof.

Only one sensor 4, 5 may be provided or two or more sensors 4, 5 may be provided, as already mentioned above.

When two or more sensors 4, 5 are provided, preferably, at least one sensor 4, 5 is arranged inside the winding defined by said at least one inductor 3, and at least one second sensor 4, 5 is arranged outside the winding defined by said at least one inductor 3.

Alternatively, all sensors 4, 5 may be arranged outside the winding defined by said at least one inductor 3, or all sensors 4, 5 may be arranged inside the winding defined by said at least one inductor 3.

In a particular embodiment, the at least one inductor 3 and at least one sensor 4, 5 are arranged on the same surface of the layer 2, the at least one sensor 4, 5 being preferably inside the at least one inductor 3; and at least one sensor 4, 5 is arranged on the opposite surface of the layer 2.

The at least one sensor 4, 5 preferably has a smaller size, in particular a much smaller size, with respect to the size of the at least one inductor 3.

The at least one sensor 4, 5 is close to the at least one inductor 3. Preferably, the at least one sensor 4, 5 is at a distance, in particular, a minimum distance, from the at least one inductor 3 from 0.5 to 50 mm, for example, from 0.5 to 20 mm. As will be further described, when two or more inductors 3 are provided, preferably at least one sensor 3 is close to at least one inductor 3.

By way of example only, when the at least one sensor 4, 5 is arranged outside the winding defined by the at least one inductor, the at least one sensor 4, 5 is proximal to a curved stretch of the at least one inductor 3, as, for example, shown in the Figures.

The at least one sensor 4, 5 may, for example, be of the capacitive type or of the inductive type. Preferably, a sensor 4, 5 of the capacitive type is provided with a single end portion 42, 52 for connection, in particular, to the electronic control unit, for example, for a signal connection to an oscillating circuit. A sensor of the capacitive type may however be provided with a plurality (for example two) of electrical connection terminals, as it will be described further, in particular in the case of a sensor for mutual capacitance reading.

A sensor of the inductive type (not shown) has two end portions for the connection, in particular, to the electronic control unit, for example, for a signal connection to an oscillating circuit.

With particular reference to FIGS. 4 and 4A, an example of a sensor—indicated with reference numeral 5—defines a winding. This type of sensor 5 is particularly adapted to be used as a sensor of the capacitive type. The winding is defined, in particular, by a conductive track which comprises a plurality of coils. The winding may, for example, be a spiral winding, in particular, a flat spiral winding. For example, the winding may have a substantially circular conformation. The number of coils of the at least one sensor 5 may be, for example, from 2 to 50 or from 2 to 10. The maximum diameter of the winding of the sensor 5 may, for example, be from 5 to 25 mm.

The width of the conductive track of the sensor 5 may, for example, be from 0.05 to 1 mm.

The pitch between the coils of the sensor 5 may, for example, be from 0.01 to 1 mm.

With particular reference to FIGS. 1, 2, 3, 5 and 6, another example of a sensor—indicated by reference numeral 4—comprises a portion 41 (FIG. 2) formed by a layer, in particular a flat layer, substantially continuous, and in particular it does not define a winding. This type of sensor 4 is particularly adapted to be used as a sensor of the capacitive type. Preferably, the portion 41 defines a circle, preferably having a diameter from 5 to 25 mm.

In the examples shown, the at least one sensor 4, 5 comprises only one end portion 42, 52. For example, the end portion 42 branches from the portion 41, and the end portion 52 branches from the winding of the sensor 5. As anticipated, in the case of an inductive sensor, two end portions are provided for each sensor 4, 5.

It is clear that the at least one sensor 4, 5 may also have other conformations with respect to those described and shown. For example, another type of sensor (not shown) may comprise or consist of two distinct conductive elements (for example, made of metal), arranged on the layer 2. The two conductive elements form, in particular, the armatures of a capacitor. The aforesaid conductive elements are preferably flat. The aforesaid conductive elements are separated from each other, in particular they are close to each other.

Each conductive element is provided with a respective connection terminal. A first conductive element may be connected to an output of the control unit, which injects electrical current to the first conductive element; the second conductive element may instead be connected to an input of the control unit, so as to measure the charge variation on the capacitor, caused by the injection of current on the first conductive element. This particular construction configuration corresponds to a capacitive reading of the mutual capacitance type.

When two or more sensors 4, 5 are provided, it is preferable that they are all of the same type, for example, it is preferable that all sensors 4 or all sensors 5 are provided. However, it is also possible to provide a combination of sensors 4, 5, i.e., one or more sensors 4 and one or more sensors 5.

In the particular examples shown in FIGS. 1, 2, 3, 4, 5 and 6 only one inductor 3 arranged on the layer 2 is provided.

Figure 2:
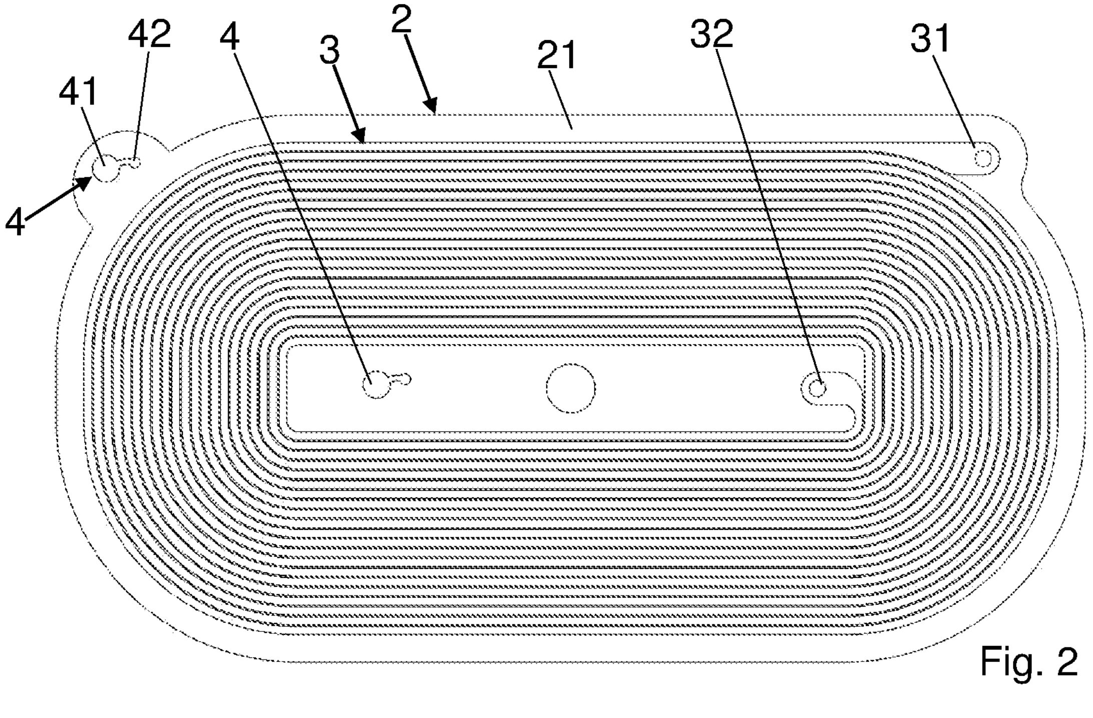
FIG. 2 shows a top plan view of the induction heater in FIG. 1.

In the particular example shown in FIGS. 1 and 2, the induction heater 1 is provided with two sensors 4, in particular only two sensors 4. One of the two sensors 4 is arranged inside the winding defined by the inductor 3 and the other sensor 4 is arranged outside the winding defined by the inductor 3.

In the particular example shown in FIGS. 3, the induction heater is provided with four sensors 4, in particular only four sensors 4. One of the sensors 4 is arranged inside the winding defined by the inductor 3, and the other sensors 4 are arranged outside the winding defined by the inductor 3. In particular, each external sensor 4 is at a respective curved stretch of the inductor 3.

In the particular example shown in FIGS. 4 and 4A, the induction heater is provided with a sensor 5, in particular with only one sensor 5. The sensor 5 is arranged outside the winding defined by the inductor 3, in particular at a curved stretch of the inductor 3.

In all the embodiments, preferably, the induction heater comprises electrically conductive means 6, 7 arranged between the at least one inductor 3 and the at least one sensor 4, 5.

For example, at least one electrically conductive track 6, 7 (FIG. 5) is provided, arranged between the at least one inductor 3 and the at least one sensor 4, 5. The at least one conductive track 6, 7 is arranged on said electrically insulating layer 2, in particular, it is fixed to said layer 2, preferably it is in direct contact with said layer 2 or it is fixed to the layer 2 by means of an adhesive layer. The at least one conductive track 6, 7 preferably defines a closed path.

The at least one track 6, 7 is preferably made of metal, for example, copper or aluminum, or copper alloy or aluminum alloy.

Preferably, the at least one track 6, 7 is made of the same material with which the at least one sensor 4, 5 and the at least one inductor 3 are made.

Preferably, but not exclusively, the at least one track 6, 7 has the same thickness, or substantially the same thickness, as the at least one inductor 3 and/or the at least one sensor 4, 5.

Preferably, the at least one track 6, 7 is arranged on the same surface 21 on which the at least one inductor 3 and the at least one sensor 4, 5 are arranged.

The at least one conductive track 6, 7 may advantageously act as a ground and/or shielding track, in particular, to shield the at least one sensor 4, 5 from interferences, for example, of electromagnetic nature, caused by the at least one inductor 3.

The at least one track 6, 7 may, for example, be electrically connected to ground, so as to act as ground, and/or it may be electrically connected to one or more sensors 4, 5 so that the track 6, 7 and the one or more sensors 4, 5 to which it is connected are at the same electrical potential. For such connections, the at least one track 6, 7 preferably comprises at least one end portion 61, 71.

Instead of the track 6, an electrically conductive net or hatch (not shown) may be provided. Similarly, instead of track 7, a net or hatch may be provided. The net or hatch is preferably made of metal.

In the particular example shown in FIGS. 5, the induction heater is provided with four sensors 4, in particular only four sensors 4. One of the sensors 4 is arranged inside the winding defined by the inductor 3, and the other sensors 4 are arranged outside the winding defined by the inductor 3. In particular, each external sensor 4 is at a respective curved stretch of the inductor 3. Furthermore, the induction heater is provided with two tracks 6, 7. The track 6 is arranged between the internal sensor 4 and the inductor 3, and the track 7 is arranged between the external sensors 4 and the inductor 3.

For example, if only external sensors were provided, only the track 7 may be provided; and if, for example, only the internal sensor 4 was provided, only the track 6 may be provided.

It should be noted that in the examples described, which are not limitative, the sensors 4 may be replaced with the sensors 5, and that the sensor 5 in FIGS. 4 and 4A may be replaced with a sensor 4.

In all the embodiments, preferably, the induction heater comprises at least one further electrically insulating layer (not shown). Preferably, the at least one inductor 3 and/or the at least one sensor 4, 5 may be arranged between the layer 2 and at least one further electrically insulating layer.

For example, when the at least one inductor 3 and the at least one sensor 4, 5 are arranged on the same surface 21, a further insulating layer may be provided, and the at least one inductor 3 and the at least one sensor 4, 5 are arranged between the layer 2 and the further electrically insulating layer.

When at least one sensor 4, 5 is provided on a surface opposite to the surface on which the at least one inductor 3 is arranged, for example, two further insulating layers are optionally provided, so that the at least one inductor 3 is arranged between the layer 2 and a first further insulating layer, and so that the at least one sensor 4, 5 is arranged between the layer 2 and a second further insulating layer.

It should be noted that said further electrically insulating layer may also be a coating obtained, for example, by spraying. In this case, the at least one inductor 3 and the at least one sensor 4, 5 may, for example, be provided with a respective further insulating layer.

In all the embodiments, preferably, at least one magnetic flux concentrator 8 (FIG. 1) is provided.

The magnetic flux concentrator 8 is made, for example, of ferrite or comprises ferrite.

The magnetic flux concentrator 8 is arranged at the at least one inductor 3 and preferably also at the at least one sensor 4, 5 of said one or more sensors 4, 5. In particular, the layer 2 is interposed between the at least one inductor 3 and the magnetic flux concentrator 8. Preferably, the electrically insulating layer 2 is also interposed between at least one sensor 4, 5 of said one or more sensors 4, 5 and the magnetic flux concentrator 8.

Optionally, the magnetic flux concentrator 8 is fixed to the layer 2 by means of fixing means. The aforesaid fixing means which fix the magnetic flux concentrator 8 to the layer 2 may be of the mechanical type and/or of the adhesive type.

Optionally, the magnetic flux concentrator 8 is in contact with the layer 2, optionally directly in contact with the layer 2.

When said further insulating layer is provided, also the latter may be optionally interposed between the magnetic flux concentrator 8 and the at least one inductor 3, in particular when the at least one inductor 3 and at least one sensor 4, 5 are arranged on opposite surfaces of the layer 2.

The magnetic flux concentrator 8 may, for example, consist of several pieces, for example, four pieces, as shown in FIG. 1. The magnetic flux concentrator 8 may however be formed by a single piece.

When two or more inductors 3 are provided, a magnetic flux concentrator 8 is provided for each inductor 3.

Preferably, the magnetic flux concentrator 8 is in contact with the electrically insulating layer 2, preferably directly in contact with the electrically insulating layer 2.

In all the embodiments, preferably, there is a support 9 (FIG. 1) arranged below the layer 2, in particular, below the magnetic flux concentrator 8 (when provided). The support 9 is preferably substantially flat, for example, it is a support plate. The support 9 is preferably made of mica or of a material comprising mica or made of metal material, for example, in aluminum or aluminum alloy.

Preferably, the support 9 substantially has the same contour as the layer 2.

Preferably, the support 9 is fixed to the layer 2, for example by means of fixing means, and the magnetic flux concentrator 8 is interposed between the layer 2 and the support 9.

Advantageously, the assembly comprising or consisting of the layer 2 provided with at least one inductor 3 and with at least one sensor 4, 5; and, preferably, also the magnetic flux concentrator 8, and, optionally, the support 9 can be easily fixed to another support 11, in particular, to a support plate 11 or carrier plate, on which other induction heaters 1 can be fastened. The aforesaid fixing means, which fix the support 9 to the layer 2 may be of the mechanical type and/or of the adhesive type.

In all the embodiments, preferably, at least one temperature sensor 10 (FIG. 1) is provided, preferably at least one temperature sensor 10 for each inductor 3.

The temperature sensor is, for example, of the SMD, THT/PTH, SMT type. The temperature sensor may, for example, be positioned on the insulating layer 2 or welded at appropriate connection terminals on electrically conductive tracks (not shown) arranged on the layer 2.

Preferably, for each inductor 3, at least one temperature sensor 10 is provided, arranged inside the winding of the inductor 3, for example, at the center of the inductor 3.

Preferably, the layer 2 and, when provided, the magnetic flux concentrator 8 and preferably also the support 9, are provided with a respective opening crossed by the temperature sensor 10.

In all the embodiments, preferably, the at least one inductor 3 and the at least one sensor 4, 5 are made by removing material from at least one metal foil, for example by etching, in particular chemical etching, at least one metal foil. For example, in summary, the metal foil from which the at least one inductor 3 and/or the at least one sensor 4, 5 is obtained is fixed to the layer 2. By means of suitable masks, foil portions are removed by etching, so as to leave the foil portions which define the at least one inductor 3 and/or the at least one sensor 4, 5. The induction heater may however be made in other manners, for example, but not exclusively, by means of mold cutting or by means of laser cutting.

When the at least one inductor 3 and at least one sensor 4, 5 are on the same surface 21 of the layer 2, preferably and advantageously, the inductor 3 and the at least one sensor 4, 5, and, when provided, preferably also the at least one track 6, 7 are made from the same metal foil, in particular arranged on the surface 21. Therefore, the at least one inductor 3 and the at least one sensor 4, 5 may substantially be produced during the same step, or group of steps, of the same production process When the at least one inductor 3 and at least one sensor 4, 5 are on opposite surfaces 21, 22 of the layer 2, the inductor 3 and the at least one sensor 4, 5 are obtained from a respective metal foil arranged on a respective surface 21, 22 of the layer 2.

To obtain the aforesaid fixing of the metal foil to the layer 2 it may, for example, be provided that the surface 21 and/or the surface 22 of the layer 2 are adhesive. For example, the metal foil may be laminated with the layer 2 and the adhesion may be obtained cold, by pressure, or hot. Furthermore, or alternatively, above the layer 2, an adhesive, for example silicone-based, may be arranged, on which the metal foil is subsequently arranged, for example, by lamination.

As already mentioned, the induction heater may comprise two or more inductors 3 arranged on the layer 2, for example, two, three, four, five, six, seven, eight, ten or twelve inductors 3 arranged on the same layer 2.

Preferably, but not exclusively, the inductors 3 are equal or substantially equal to one another.

Preferably, at least one sensor 4, 5 is provided close to at least one inductor 3, preferably at least one sensor 4, 5 for each inductor 3. For example, two or more, three or more, or four or more sensors 4, 5 may be provided for each inductor 3. Therefore, on the same layer 2, a plurality of inductors 3 and a plurality of sensors 4, 5 may be provided.

For each inductor 3 the mutual arrangement between the inductor 3 and the sensor 4, 5, or the sensors 4, 5, can be as described above.

Optionally, the induction heater comprises a number of inductors 3 equal to four or equal to eight or equal to twelve.

Preferably, the inductors 3, and the relative sensor 4, 5 (or the relative sensors 4, 5), are arranged according to a grid, or matrix.

Preferably, when eight inductors 3 are provided, the latter are arranged in two rows or columns. Each row comprises four inductors 3.

Preferably, when twelve inductors 3 are provided, the latter are arranged in two or three rows or columns. Each row comprises, for example, six inductors 3 (in two rows) or four inductors 3 (in three rows).

However, other arrangements of the inductors 3 are possible, for example, in two rows of six inductors 3.

Preferably, but not exclusively, each inductor 3 has two longer sides parallel to each other and two shorter sides parallel to each other, as previously described.

Preferably, all the inductors 3 are arranged so that at least one of the two longer sides of any first inductor 3 faces the longer side of a second inductor 3, and so that the shorter side of the first inductor 3 faces the shorter side of a third inductor 3.

Preferably, the longer sides of the inductors 3, in particular, the straight stretches of the longer sides, are parallel to each other; and the shorter sides of the inductors 3, in particular, the straight stretches of the shorter sides, are parallel to each other.

When inductors 3 with a substantially square conformation, with rounded corners, are provided, the inductors may be arranged in a manner similar to what has just been described for the rectangular inductors with rounded corners.

Preferably, the center-to-center distance (in particular, the geometric centers of consecutive inductors) between the inductors 3 is from 50 to 250 mm.

Figure 6:
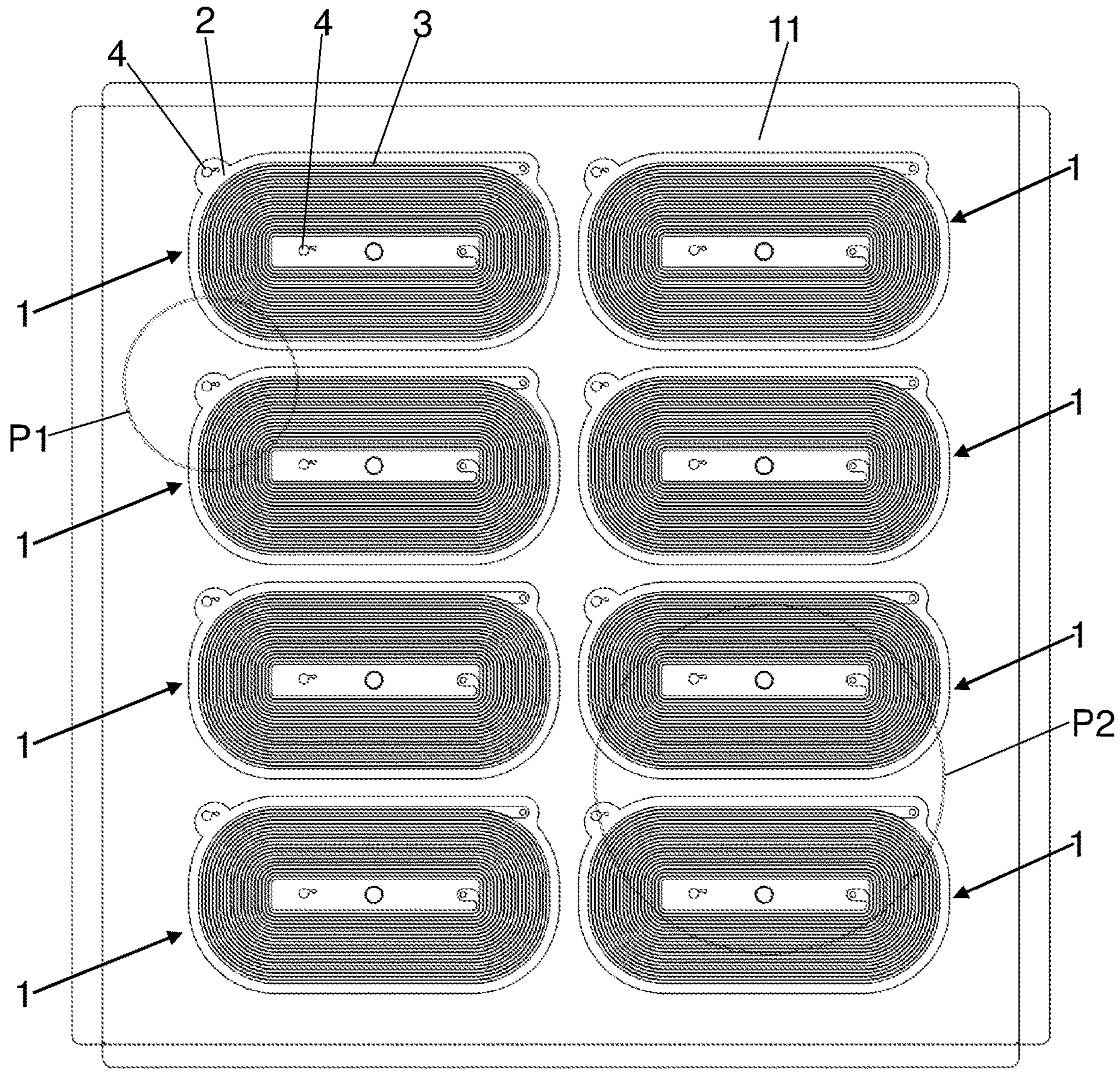
FIG. 6 shows a top plan view of part of a cooktop or cooking device, or a component of a cooktop or cooking device, in accordance with the invention.

With particular reference to FIG. 6, it is also possible to provide a component of a cooktop or cooking device, the component comprising a plurality of induction heaters, in which each induction heater 1 is preferably provided with only one inductor 3 arranged on a respective layer 2, although several inductors 3 may be provided on the same layer 2. The induction heaters 1 are arranged on the same support 11.

In particular, each induction heater 1 is arranged on the support 11.

Therefore, the layer 2 is above the support 11 and the magnetic flux concentrator 8 (when provided) and the support 9 (when provided) are between the layer 2 and the support 11.

In particular, when the support 9 is provided, the latter is fixed to the support 11; and preferably the support 9 and the support 11 are in contact, in particular directly in contact, with each other.

Preferably, but not exclusively, each induction heater 1 is provided with the respective layer 2, as shown in FIG. 6.

Each induction heater 1, as described above, comprises one or more inductors 3, for example, only one inductor 3.

Preferably, the support 11 is a flat support, for example, a support plate or carrier plate.

Preferably, but not exclusively, the inductors 3 are equal to each other, and, more generally, it is preferable that the induction heaters 1 are equal to each other.

Preferably, at least one sensor 4, 5 is provided for each inductor 3. In particular, preferably, at least one sensor 4, 5 is provided on each layer 2.

Although in FIG. 6 induction heaters 1 are shown provided each with two sensors 4, all the embodiments of induction heaters described above may be provided.

Preferably, on the support 11, a number of induction heaters 1, and therefore of inductors 3, is provided, equal to four or equal to eight or equal to twelve.

Preferably, the induction heaters 1, and therefore the inductors 3, are arranged according to a grid, or matrix.

Preferably, in particular when eight induction heaters 1 are provided, the latter are arranged in two rows or columns. Each row comprises four induction heaters 1.

Preferably, when twelve induction heaters 1 are provided, the latter are arranged in two or three rows or columns. Each row comprises, for example, six induction heaters 1 (in two rows) or four induction heaters 1 (in three rows).

However, other arrangements of induction heaters 1 are possible, for example, in two rows of six induction heaters 1.

Preferably, but not exclusively, each inductor 3 has two longer sides parallel to each other and two shorter sides parallel to each other, as previously described.

Preferably, all the inductors 3 are arranged so that at least one of the two longer sides of any first inductor 3 faces the longer side of a second inductor 3, and so that the shorter side of the first inductor 3 faces the shorter side of a third inductor 3.

Preferably, the longer sides of the inductors 3, in particular, the straight stretches of the longer sides, are parallel to each other; and the shorter sides of the inductors 3, in particular, the straight stretches of the shorter sides, are parallel to each other.

When inductors 3 with a substantially square conformation, with rounded corners, are provided, the inductors may be arranged in a manner similar to what has just been described for the rectangular inductors with rounded corners.

Preferably, the center-to-center distance (in particular, the geometric centers of consecutive inductors) between the inductors 3 is from 50 to 250 mm.

The invention also relates to a cooktop or cooking device comprising one or more induction heaters or at least one component as described above.

FIG. 6 diagrammatically shows the bottom of two pots P1, P2. Advantageously, the pots may be arranged in the positions shown and may be adequately heated.

Preferably, in all the embodiments, no sensor 4, 5 is above any inductor 3.

The invention claimed is:

1. An induction heater for a cooking surface,
the induction heater comprising
an electrically insulating layer;
at least one inductor defining a winding, adapted, at least, to heat at least one cooking utensil;
at least one sensor adapted, at least, to detect whether said at least one cooking utensil is placed above the cooking surface;
at least one magnetic flux concentrator;
wherein said at least one inductor and said at least one sensor are arranged on said electrically insulating layer;
wherein said layer is interposed between said at least one inductor and said at least one magnetic flux concentrator
the induction heater comprising electrically conductive means arranged between said at least one inductor and said at least one sensor, on said electrically insulating layer.

2. The induction heater according to claim 1, wherein said at least one inductor and said at least one sensor are flat.

3. The induction heater according to claim 1, wherein said at least one inductor has a thickness from 0.1 to 0.6 mm.

4. The induction heater according to claim 1, wherein said at least one inductor and said at least one sensor are arranged on a same surface of the electrically insulating layer, or wherein said at least one inductor and said at least one sensor are arranged on opposite surfaces of the electrically insulating layer.

5. The induction heater according to claim 1, wherein said at least one sensor is arranged inside or outside the winding defined by said at least one inductor.

6. The induction heater according to claim 1, wherein said at least one inductor and said at least one sensor are made from at least one metal foil.

7. The induction heater according to claim 1, wherein said at least one sensor defines a winding.

8. The induction heater according to claim 1, wherein said electrically conductive means comprise or consist of at least one electrically conductive track or electrically conductive grid.

9. The induction heater according to claim 1, wherein said at least one inductor and said at least one sensor adhere to the electrically insulating layer.

10. The induction heater according to claim 1, wherein said at least one sensor comprises two or more sensors arranged on said electrically insulating layer.

11. The induction heater according to claim 10, wherein at least one first sensor of said two or more sensors is arranged inside the winding defined by said at least one inductor, and at least one second sensor of said two or more sensors is arranged outside the winding defined by said at least one inductor.

12. The induction heater according to claim 11, comprising first electrically conductive means arranged between said at least one first sensor and said at least one inductor, on said electrically insulating layer and second electrically conductive means arranged between said at least one second sensor and said at least one inductor, on said electrically insulating layer.

13. The induction heater according to claim 1, wherein, parallel to said electrically insulating layer, said at least one inductor has a first maximum length greater than a second maximum length, perpendicular to said first maximum length.

14. The induction heater according to claim 1, comprising a plurality of inductors arranged on said electrically insulating layer.

15. The induction heater according to claim 14, comprising at least one sensor for each inductor of said plurality of inductors.

16. The induction heater according to claim 1, wherein said at least one magnetic flux concentrator is made of ferrite or comprises ferrite.

17. The induction heater according to claim 1, comprising a support fixed to said electrically insulating layer; wherein said at least one magnetic flux concentrator is arranged between the electrically insulating layer and said support.

18. A component for a cooktop comprising a plurality of induction heaters according to claim 1.

19. A cooktop comprising at least one induction heater according to claim 1.

20. A process for manufacturing an induction heater according to claim 1, wherein there is provided the removal of material from at least one electrically conductive foil to manufacture said at least one inductor and said at least one sensor.

21. The induction heater according to claim 8, wherein said electrically conductive means are adapted to shield the at least one sensor from interferences generated by the at least one inductor.

* * * * *